United States Patent
Maeda

[19]
[11] Patent Number: 6,026,806
[45] Date of Patent: Feb. 22, 2000

[54] AIR-CONDITIONED CONSTRUCTION OF FLOOR AND CEILING

[75] Inventor: Seiichi Maeda, Abiko, Japan

[73] Assignee: Izena Co. Ltd., Chiba-ken, Japan

[21] Appl. No.: 08/860,548

[22] PCT Filed: Oct. 25, 1996

[86] PCT No.: PCT/JP96/03125

§ 371 Date: Jun. 20, 1997

§ 102(e) Date: Jun. 20, 1997

[87] PCT Pub. No.: WO97/15792

PCT Pub. Date: May 1, 1997

[30] Foreign Application Priority Data

Oct. 26, 1995 [JP] Japan .................................. 7/300506

[51] Int. Cl.[7] .............................. E04D 13/18; F24J 2/44
[52] U.S. Cl. .......................... 126/628; 126/633; 126/638; 126/640
[58] Field of Search ................... 126/628, 633, 126/634, 638, 640, 643; 237/69

[56] References Cited

U.S. PATENT DOCUMENTS

| | | | |
|---|---|---|---|
| 2,621,027 | 12/1952 | Tatsch | 237/69 |
| 3,897,820 | 8/1975 | Teeter, Jr. | 126/633 |
| 4,082,080 | 4/1978 | Pittinger | 126/633 |
| 4,212,348 | 7/1980 | Kobayashi | 237/69 |
| 4,257,477 | 3/1981 | Maloney | 126/633 |
| 4,321,962 | 3/1982 | Doty | 126/640 |
| 4,442,826 | 4/1984 | Pleasants | 126/640 |
| 4,576,221 | 3/1986 | Fennesz | 237/69 |
| 4,811,543 | 3/1989 | Herbst | 237/69 |

FOREIGN PATENT DOCUMENTS

| | | |
|---|---|---|
| 57 95543 | 12/1980 | Japan . |
| 356077923 | 1/1981 | Japan .................................. 126/633 |
| 356010634 | 2/1981 | Japan .................................. 126/633 |
| 58-129118 | 1/1982 | Japan . |
| 357041530 | 3/1982 | Japan .................................. 126/633 |
| 357134637 | 8/1982 | Japan .................................. 126/633 |
| 59 36465 | 8/1982 | Japan . |
| 62-121363 | 1/1986 | Japan . |
| 405322318 | 12/1993 | Japan .................................. 126/633 |

*Primary Examiner*—Ira S. Lazarus
*Assistant Examiner*—David Lee

[57] ABSTRACT

To provide an inexpensive air-conditioned construction of floor and ceiling, by using as a heat accumulating agent water which is friendly to the human body and nature, and using a heat source solar energy or outside air temperature. The construction of the invention comprises a floor body and a ceiling body formed by a plurality of space portions and filled up with water, sunlight intercepting sections for permitting the contains to receive the sunlight, heating sections provided below the sunlight intercepting sections, outside air temperature receiving sections or outside heating means provided in place of the sunlight intercepting sections, and cooling sections provided above the outside air temperature receiving sections.

9 Claims, 5 Drawing Sheets

AIR-CONDITIONED CONSTRUCTION OF FLOOR AND CEILING

BACKGROUND OF THE INVENTION

1. Field of the Invention

This invention relates to a floor and a ceiling heating system to be used in winter season and in intense cold areas, and also relates to a floor and a ceiling cooling system to be used in summer season and in warm areas. In more detail, this invention relates to a construction of air-conditioning system built in floor and ceiling, characterized not only using water which is gentle to a human body and environment as a filling up agent, but also using low cost energy such as solar energy, outside air temperature and evaporating energy for heating or cooling.

2. Description of Related Art

Recently, floor heating systems are attracting a people's attention for the following reasons. That is, since a room can be heated homogeneously by conductive heat or radiation heat from a floor, this system is recognized to have features which are gentle to a human body, do not pollute surrounding air and are noiseless. Further, the room can be effectively and widely used because the floor itself is a heating system.

Up to the present time, various kinds of such floor heating system have been developed and actually carried out in various ways. These developed systems have a constructional feature that provide under a wooden floor a panel of electric heater having almost same surface area as the wooden floor and being electrically connected to the commercial electric power source, or pipes in which hot water flows, further provide an adiabator layer and a bottom layer below.

Although ceiling heating systems are popular in the northern part of Europe, they are not popular in Japan. Practically, therefore, only an air conditioner or an electric heating panel which uses a radiation heat close to a ceiling are used.

Further, an equipment installation for a cooling system which uses a floor and a ceiling is remarkably expensive, and generally it could not become so popular from the view point of high initial cost.

The conventional floor heating system is not only avoided because of the expensive equipment installation, but also because it has a problem in comfortableness. That is, since this system uses a panel heater attached to the wooden structure, its heat capacity is low and a sensible temperature is easily changed by a change of ambient atmosphere. Further, in general, regenerative agents used in a panel heater are not only very expensive but also have an environmental problem when wasted because they are chemically synthesized compounds. To solve this problem, the applicant of this invention has already disclosed a floor heating system which uses water as a regenerative agent in Japanese patent application H5-135178 (Japanese patent laid open publication H6-323554), however, electric energy is mainly used for a heating means in this invention.

SUMMARY OF THE INVENTION

The inventors of this invention have conducted intensive studies to solve the above mentioned problems which conventional floor heating systems have, and developed the following floor heating system. That is, an embodiment of floor heating system according to the present invention is constructed by forming an intermediate layer between a surface floor board and a bottom supporting layer, wherein the intermediate layer is divided into plural spaces by dividing frames which support and divide the intermediate layer, setting containers filled up by water into each of the plural spaces and forming a floor main body, and further providing sun-light receiving sections which receive sun-light to some of said containers.

According to another embodiment of the invention, there is provided a construction of floor heating system wherein a concrete or a mortar base layer is constructed under a surface board by embedding plural containers filled up by water in said concrete or mortar base layer, and providing sun-light receiving sections which receive sun-light to some of said containers.

According to still another embodiment of the invention, there is further provided a construction of ceiling heating system which is obtained by forming an intermediate layer between a surface ceiling board and an upper supporting layer, said intermediate layer being divided into plural spaces by dividing frames which support and divide the intermediate layer, setting containers filled up by water into said plural spaces thereby forming a ceiling main body, and further providing sun-light receiving sections which receive sun-light to some of said containers.

Further, in the floor and ceiling heating systems according to this invention, a heating part which is located below the floor main body or the ceiling main body is provided to partial or whole part of the sun-light receiving section.

In still another embodiment of the invention there is provided a floor and ceiling heating system wherein a heating part which is located below the floor main body or the ceiling main body is provided together with another heating means to partial or whole part of said sun-light receiving section.

In addition, the floor and ceiling heating system of this invention may include a substantially horizontal heat conductive controlling layer having lower heat conductivity provided to the upper surface of water contained in a container.

The present invention also provides an air-cooling system, which is constructed within a floor space, and is obtained by forming an intermediate layer between a surface floor board and a bottom supporting layer, said intermediate layer being divided into plural spaces by dividing frames which support and divide the intermediate layer, setting containers filled up by water into said spaces and forming a floor main body and further providing outside air temperature receiving sections which receive outside air temperature to some of said containers.

The present invention further provides a ceiling cooling system obtained by forming an intermediate layer between a surface ceiling board and an upper supporting layer, said intermediate layer being divided into plural spaces by dividing frames which support and divide the intermediate layer, setting containers filled up by water into said plural spaces and forming a ceiling main body, and further providing outside air temperature receiving sections which receive outside air temperature to some of said containers.

In preferred aspects of the floor and ceiling cooling system of this invention, a cooling part which is located above the floor main body or the ceiling main body is provided to partial or whole part of the outside air temperature receiving section.

Therefore, a main object of the present invention is to provide an air-conditioned construction using water as a regenerative heat transfer agent, which is gentle to a human body and environment, comfortable, safe and low in price.

That is, the present invention is characterized by using water as a regenerative heat transfer agent instead of expensive chemically synthesized compounds, and by using solar energy, outside air temperature or evaporative energy as a heat source, and further by circulating water naturally by convection caused by heating of a heating part located in a lower position of the system without using a special energy for the circulation of water.

BRIEF DESCRIPTION OF THE DRAWINGS

An air-conditioned construction of floor and ceiling of this invention which has accomplished above mentioned objects are illustrated by attached drawings of specific embodiments and the accompanying drawings in which.

DETAILED DESCRIPTION OF THE INVENTION

The action of this invention is explained as follows. By using water as a filling up agent, since whole water in container is heated homogeneously by convection action of water when heated, temperature of whole surface floor is raised to the same temperature. And, the operating cost is virtually nil because it uses solar energy as an energy source. Additionally, to the sun-light receiving section a heating part located below the floor or ceiling main body is joined so that the heated water ascends to the upper position by convection and warm up whole surface of the floor or the ceiling. Further, by providing another heating means as an annex to the sun-light receiving section, the effect of it is still more enlarged.

Still further, when a heat conductivity controlling layer is set up, period for heat radiation can be extended and the floor can be maintained at comfortable temperature range for longer period, and it is possible to maintain the floor in a heating state for a long period.

This system is an air-cooling system characterized by using outside air temperature or evaporation energy, it therefore does not cost so much. In addition, by attaching cooling part located above the floor or ceiling main body to the outside air temperature receiving section, cooled water goes down to the lower position by the convection of water and cools down whole surface of the floor or the ceiling.

THE BEST EMBODIMENT TO CARRY OUT THE INVENTION

The present invention relates to a construction of floor 1 and/or ceiling 2 heating system to be used in winter season and in intense cold area and more in detail relates to a construction of central heating system which is built in floor 1 and/or ceiling 2 and uses water which is gentle to a human body and an environment as a heat-transfer liquid, which further uses solar energy as a free energy source. Also, the construction of the floor heating system of this invention is characterized by intermediate layer 13 formed between a surface floor board 11 and a bottom supporting layer 12. Intermediate layer 13 is divided into plural spaces 15 by dividing frames 14 which support and divide the intermediate layer. Containers 16, filled with water, are set into the spaces 15, thereby forming a floor main body 17. Additionally, sunlight receiving sections 18, which are adapted to receive sunlight, are attached to some or all of containers 16. Similarly, with regard to the ceiling heating system an intermediate layer 23 is formed between a surface ceiling board 21 and an upper supporting layer 22. Intermediate layer 23 is divided into plural spaces 25 by dividing frames 24 which support and divide the intermediate layer. Containers 26 filled up by water, are set into the spaces 25, thereby forming a ceiling main body 27. Sun-light receiving sections 28, which are adapted to receiving sunlight, are attached to some or all of containers 26. Additionally, heating parts 18a, 28a (see FIG. 3), which are located below the floor main body 17 or the ceiling main body 27, respectively, are operatively associated with the partial or whole part of said sun-light receiving sections 18, 28.

Heating means 6 may be provided within spaces 15 for containers 16, together with sun-light receiving section 28. In a floor structure such as shown in FIG. 2A, constructed with concrete or a mortar base layer 2A under the surface floor board 11, it is possible to embed plural containers 16 in which water W is filled up and to provide a heat source to heat the water in each container. Further, as shown in the embodiment of FIG. 2b, a substantially horizontal heat conductivity controlling layer 7 which has lower heat conductivity, is provided at the upper level of water.

The present invention also relates to a construction of floor and/or ceiling cooling system to be used in summer season and in warm area, and more in detail relates to a construction of air-conditioning system which is built in floor 1 and/or ceiling 2 and uses water as heat transfer agent. According to this aspect of the invention, outside air or evaporative energy, which does not cost much, is used as the energy source. The floor air-conditioning construction of this invention is characterized by intermediate layer 13 formed between surface floor board 11 and bottom supporting layer 12, wherein intermediate layer 13 is divided into plural spaces 15 by dividing frames 14 which support and divide the intermediate layer. Containers 16 filled up with water, are set into said plural spaces 15, thereby forming floor main body 17. Additionally, outside air receiving section 19 (see FIG. 4) which is adapted to receive outside air is provided to some or all of containers 16. Similarly, with regard to the ceiling air-conditioning system, intermediate layer 23 is formed between surface ceiling board 21 and upper supporting layer 22, and the intermediate layer 23 is divided into plural spaces 25 by dividing frames 24 which support and divide the intermediate layer. Into these spaces, containers 26 filled with water, are set, thereby forming a ceiling main body 27. Outside air receiving section 29 which is adapted to receive outside air, is attached to at least some of containers 26. Additionally, cooling parts 19a, 29a which are located above the floor main body 17 or ceiling main body 27, respectively, are operatively associated with the partial or whole part of outside air temperature receiving section 29.

Figure 1:
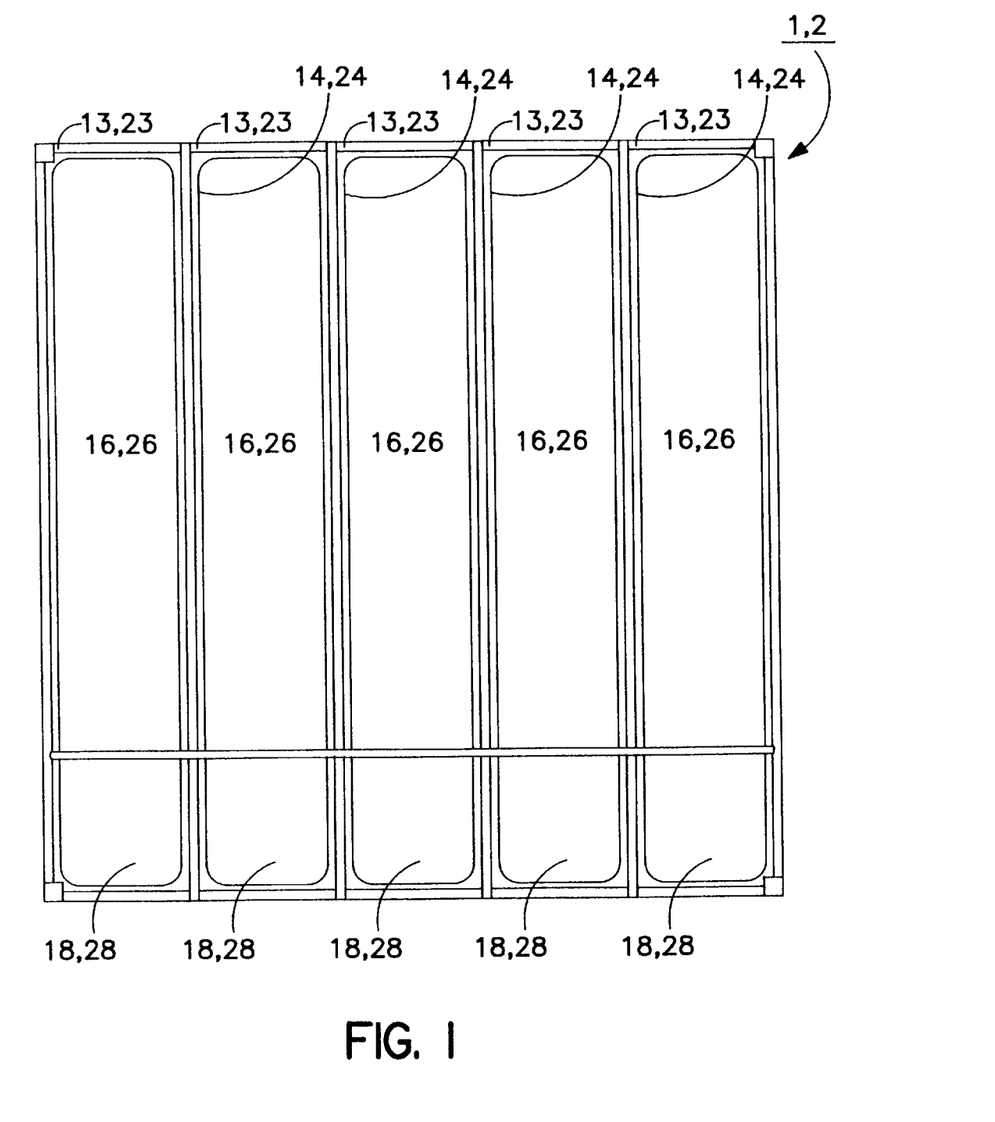
FIG. 1 is a schematic plan view illustrating an embodiment of an air-conditioned construction of floor and ceiling of this invention.
Figure 2:
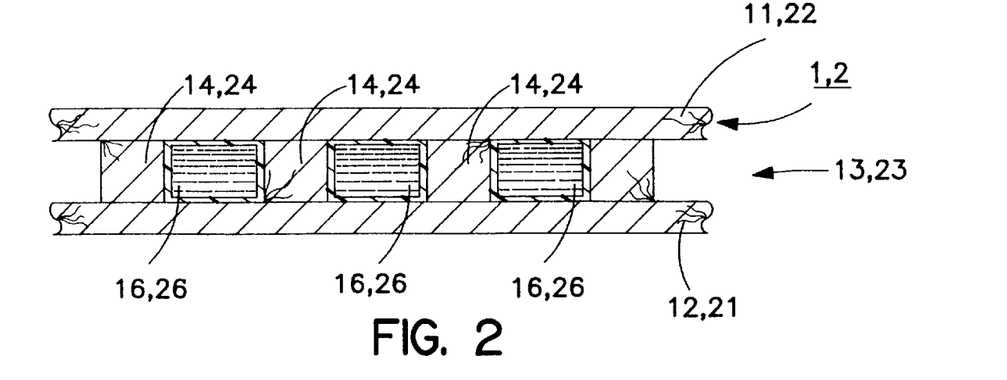
FIG. 2 is a schematic sectional view illustrating an embodiment of an air-conditioned construction of floor and ceiling of this invention.
Figure 2A:
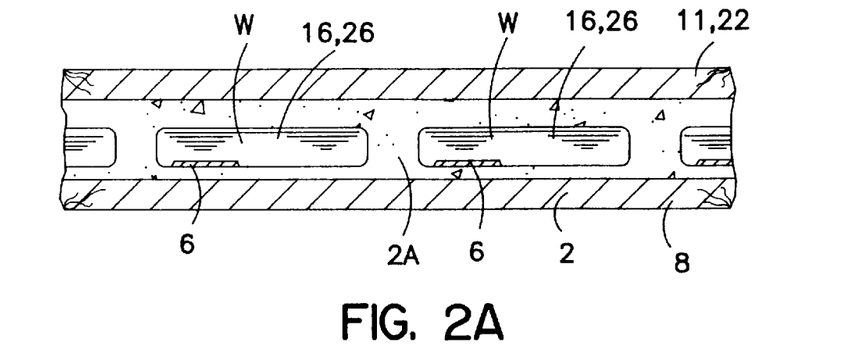
FIG. 2a and FIG. 2b are schematic sectional views illustrating other embodiments of the invention.
Figure 2B:
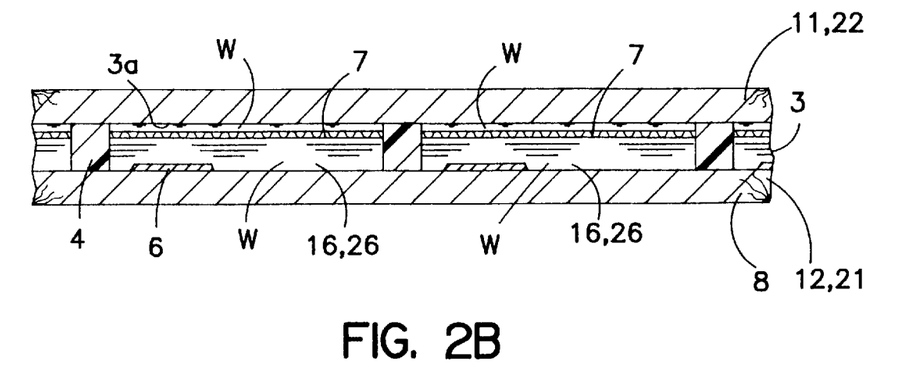

In case of the construction of a cooling and heating system of floor 1, as illustrated by FIGS. 1 and 2, a woody surface floor board 11, an adiabator and a bottom supporting layer 12 such as wire net is constructed on a base of building, and an intermediate layer 13 which has a voluntary height is formed between said surface floor board 11 and said bottom supporting layer 12. By dividing and supporting said intermediate layer 13 with dividing frames 14, plural spaces in which containers 16 can be set are formed, and the size of spaces 15 can be set up voluntarily, further, an adiabator (insulation) layer of plastic foam or felt under the surface floor board 11 can be also voluntarily prepared.

Then containers 16 are set into said plural spaces 15. As the container 16, a flexible container made of single layer or complex layer of synthetic resin, synthetic rubber or non-woven cloth, or a rigid container made of metal such as stainless steel or hard type synthetic resin can be preferably used, and water is filled up into said containers 16.

The sun-light receiving sections 18 which receive sun-light S are attached to some of said containers 16. As illustrated in the first floor of FIG. 4, said sun-light receiving sections 18 itself can be a floor which is designed to receive sun-light S actively such as sun room, or can be placed at windowside where always sun-light shines, further, it can be constructed at the outside position where sun always shines by making a hole through an outer wall of the building.

Further, upper surface of the sun-light receiving section 19 can be covered by a heat accumulator which absorbs solar energy efficiently and heat the sun-light receiving sections effectively. Additionally, during night time, to prevent the cooling down of temperature, it is possible to cover it by an adiabator.

To the bottom or side surface of the containers 16, it is possible to provide another heating means which heats the contained water by other kinds of energy such as sheet type electric heater, heat accumulating pipe placed on a roof, hot air generator or water heater. Thus the energy for heating can be effectively obtained by using said subsidiary heating means together with the solar energy.

The invention of the heating system of ceiling 2 is almost similar to the above mentioned construction of the floor heating system and the only one different point is that it is built in ceiling instead of floor. An intermediate layer 23 is formed between a surface ceiling board 21 and upper supporting layer 22, said intermediate layer 23 is divided into plural spaces 25 by dividing frames 24 which support and divide the layer, containers 26 filled up by water are set into said plural spaces 25 and form a ceiling main body 27, and sun-light receiving sections 28 are similarly provided.

And the floor 1 and ceiling 2 heating system can be carried out in the floor 1 and ceiling 2 heating system. As illustrated by floor 1 of the first floor of FIG. 3, heating parts 18a and 28a which are located below the floor main body 17 or ceiling main body 27 are provided to the partial or whole part of said sun-light receiving sections 18 and 28.

Figure 3:
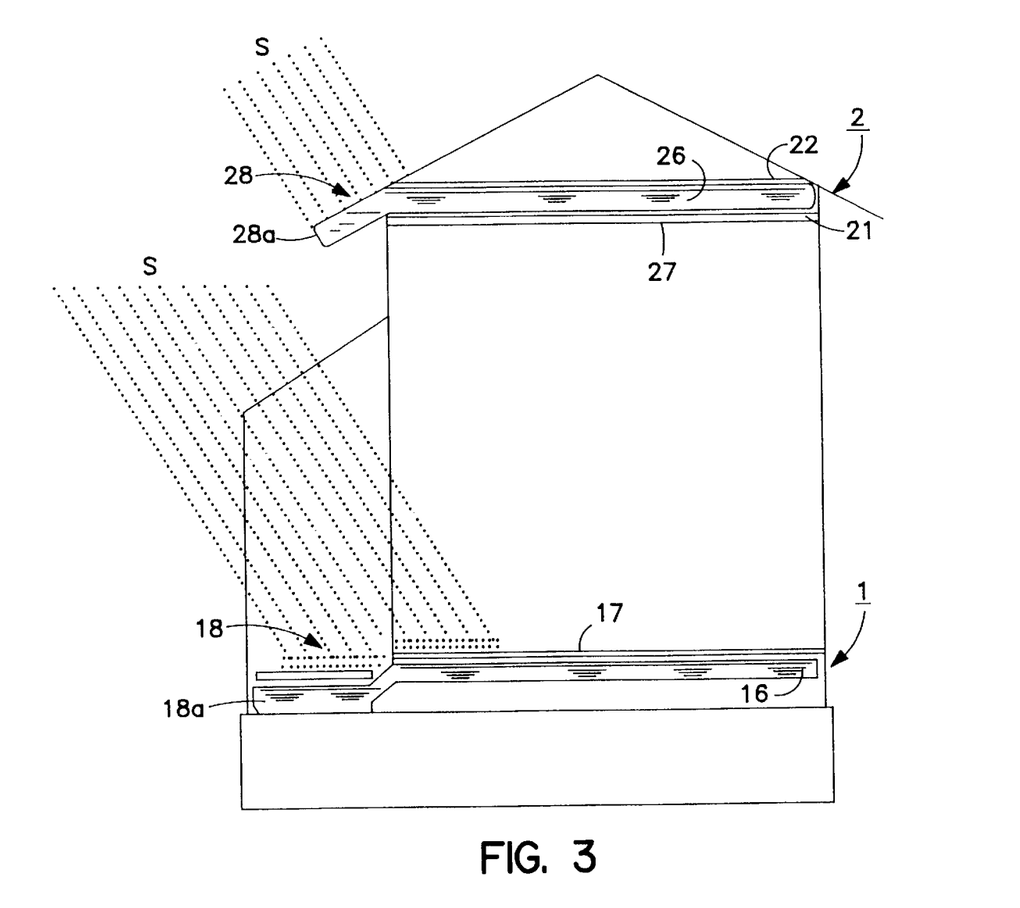
FIG. 3 is a schematic view illustrating an embodiment of an air-conditioned construction of floor and ceiling of this invention.

That is, by joining heating parts 18a and 28a which are located below the floor main body 17 or ceiling main body 27, warm water which is heated in the sun-light receiving sections 18 and 28 ascend to the upper position by natural convection and is extended to the whole floor main body 17 or the ceiling main body 27. On the contrary, cool water flows back to the heating parts 18a and 28a which are located below the floor main body 17 or ceiling main body 27 and heated in the sun-light receiving sections 18 and 28 and ascend again to the upper position by natural convection. This circulation is repeated, thus the heating can be carried out effectively.

After sunset, the temperature of heating parts 18a and 28a become lower than that of floor main body 17 or ceiling main body 27, however, water of lower temperature remaining in the heating parts 18a and 28a located below the floor main body 17 or ceiling main body 27 remains there without being circulated by convection. Therefore, it is possible to maintain the warm temperature of floor 1 or ceiling 2 for many hours.

If it is necessary to increase the temperature of the floor heating system to a higher temperature effectively, it is possible to set up a heat conductive controlling layer 7 to the upper surface of water contained in a container 16 almost horizontally (shown in FIG. 2b). As the said heat conductive controlling layer 7, a water passable package in which active carbon or arum root paste is filled up, a high water absorbing material used as the material for a paper diaper or a material which gels by adding water can be used, and the object of it is to control the energy conduction to the upper region by reducing the heat conduction lower than that of water.

In this case, water contained in said heat conductive controlling layer 7 is not influenced by convection of water, and heat energy is received from the contacted surface of water by means of heat conduction. Said heat conductive controlling layer 7 has a function to control the heat energy conduction, however, heat energy is conducted slowly at the surface between the heat conductive controlling layer 7 and water which exists above. That is, even if the temperature of water below the heat conductive controlling layer 7 is set up at high temperature, water above the heat conductive controlling layer 7 can maintain comfortable temperature without being largely influenced by the temperature of water below, and the heating effect can be maintained for many hours after the heat supply is shuttered.

When the temperature of floor surface becomes higher by influence of sun-light or a foot-warmer than that of contained water, heat energy is stored in water, further the temperature of whole unit in which one container 16 is set is uniformly warmed up, and partial high temperature can be avoided.

Figure 4:
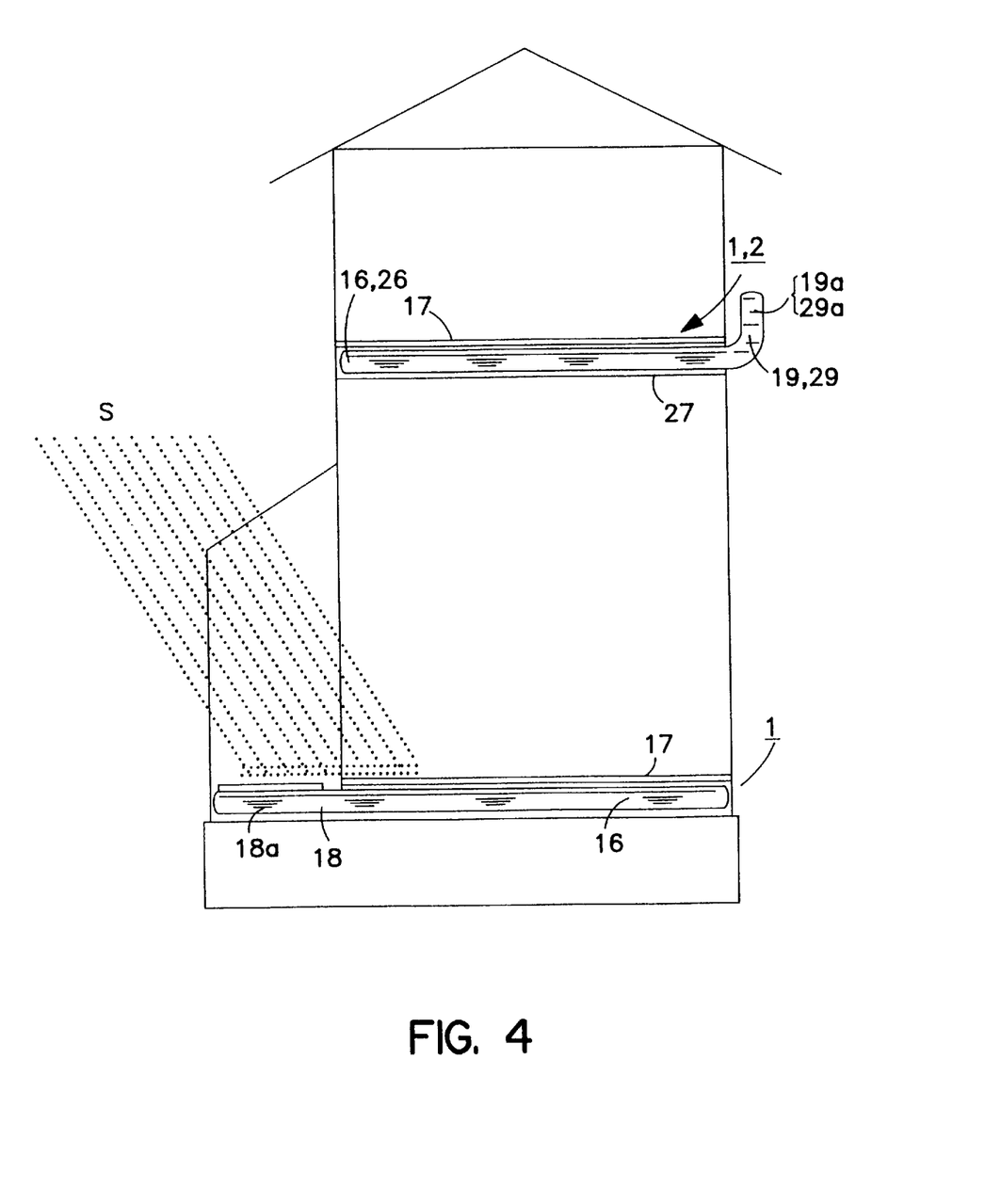
FIG. 4 is a schematic view illustrating an embodiment of an air-conditioned construction of floor and ceiling of this invention.
Figure 5:
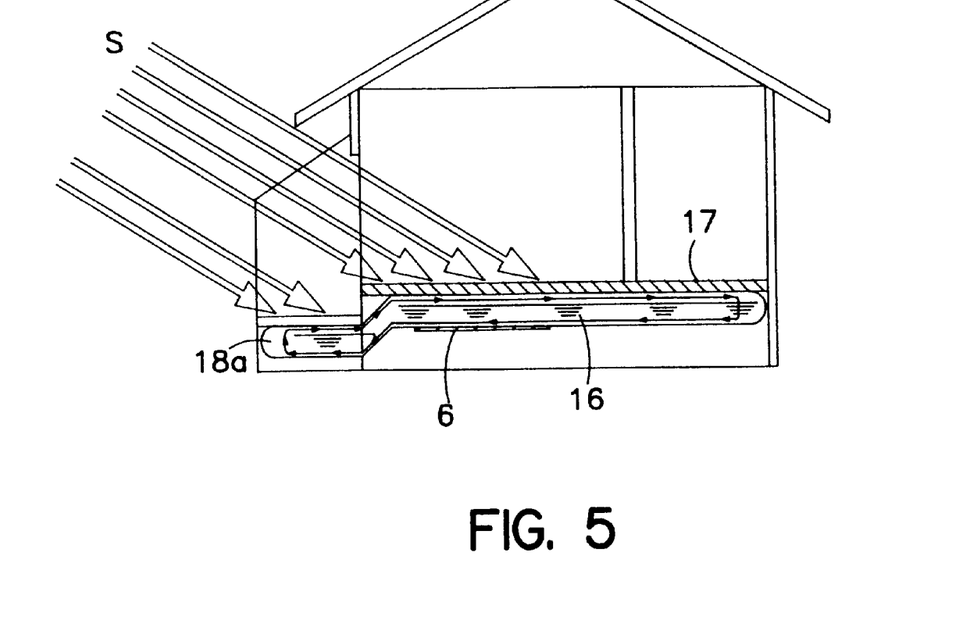
FIG. 5 is a schematic view illustrating an embodiment of a heating system equipped with another heating means.
Figure 6:
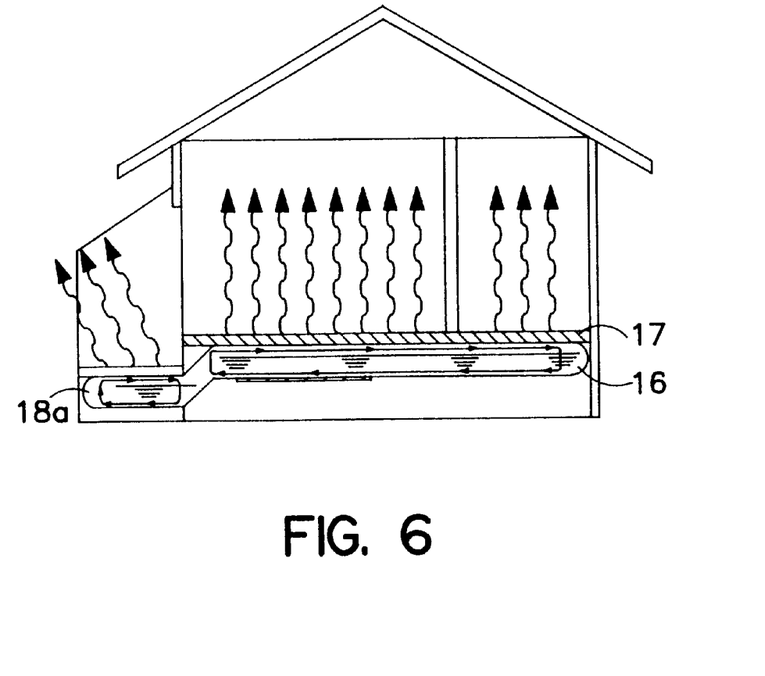
FIG. 6 is a sectional view of an embodiment of a cooling system according to the invention.

Since the floor main body 17 of floor 1 cooling system of FIG. 3 or FIG. 4 is almost same to the construction of floor 1 heating system, the detailed construction of it is not described here. An outside air temperature receiving section 19 is attached to some of containers 16. Said outside air temperature receiving section 19 is located at northern wall of building where it is always shaded from sun-light, further it is possible to cool it down using vaporizing heat of water by sprinkling water over the surface.

The ceiling main body 27 of ceiling 2 cooling system of FIG. 3 or FIG. 4 is almost same to the construction of the ceiling 2 heating system, further the outside air temperature receiving section 29 is almost similar to the construction of the cooling system of FIG. 4.

Additionally, the construction of floor 1 and ceiling 2 cooling system of this invention is carried out in the floor 1 and ceiling 2 cooling system, as illustrated by floor 1 of the second floor or ceiling 2 of the first floor of FIG. 4, cooling parts 19a, 29a which are located above the floor main body 17 or ceiling main body 27, respectively, are provided to the partial or whole part of said outside air temperature receiving sections 19, 29.

That is, by joining heating parts 19a and 29a located above the floor main body 17 or the ceiling main body 27, chilled water cooled down by outside air temperature descends to the lower position by natural convection and is extended to the whole floor main body 17 or to the whole ceiling main body 27. On the contrary, warm water remains at the cooling parts 19a and 29a located above the floor main body 17 or the ceiling main body 27 and chilled by the cooler outside air and descend again to the lower position by natural convection. This circulation is repeated, thus the cooling can be carried out effectively.

That is, the important point of the air conditioned construction of floor 1 and ceiling 2 is to perform an effective cooling and heating using skillfully convection of water, heat energy stored in water contained in a container 16, 26 is conducted to a surface floor board 11 or a surface ceiling board 21 and radiated to a room as conductive heat or as radiant heat from said surface floor board 11 or said surface ceiling board 21.

This invention relates to a construction of the floor 1 and ceiling 2 cooling and heating system and covers from small scale construction for an individual house to large scale construction for buildings, such as school, kindergarten or hospital. Since water which is cheap and can be easily procured is used as the filling up agent, it is possible to be procured at the construction site without a transportation cost, further, when the house or the building is pulled down, contained water can be wasted without hurting a human body or an environment, and even if is used by recycling it is not deformed by repeating uses.

Further in this invention, since sun-light energy and outside air is practically used as an energy source, the equipment is safe and can operate without operating cost.

POSSIBILITY FOR AN INDUSTRIAL USE

As above mentioned, since water is used as the filling up agent, partially heated or cooled water at the sun-light receiving section or outside air receiving section is diffused by convection and the temperature of water becomes uniform, and the uniform temperature is conducted to a surface floor board or a surface ceiling board, and so the uniform temperature is diffused to whole room. Further, the price of water used as filling up agent is relatively cheap, additionally, in a case of throwing away or in a case of accident of leaking, water does not affect a human body and an environment. Thus, the air-conditioning system built in a floor and a ceiling of this invention can be said to be gentle to a human body and an environment, additionally, an operating cost is not needed because natural energy is practically used. Namely, the present invention can be said as an epoch-making and an useful invention.

I claim:

1. A solar energy heating system located in a floor of a room or building and comprising:
   (A) a floor main body comprising
      (a) a floor structure comprising
         (i) a surface floor board,
         (ii) a bottom supporting layer,
         (iii) an intermediate layer formed by and between the surface floor board and the bottom supporting layer; and,
         (iv) dividing frames dividing the intermediate layer into a plurality of open spaces; and
      (b) a container located within each of said plurality of open spaces, said containers capable of being filled with and storing water;
   (B) sunlight receiving member capable of holding water therein in fluid flow communication with at least some of said containers, wherein water contained within said sunlight receiving member may be heated by solar energy during times of exposure thereof to sunlight, and wherein said heated water is in fluid flow communication with water contained within said containers; and
   (C) a heating member at a lower elevation than the floor main body and joined in fluid flow communication to at least part of the sunlight receiving member, whereby water warmed by solar energy is conveyed in an upward direction by convection current to warm the water within the containers and wherein cooler water within said containers returns in a downward flow direction by convection current to the sunlight receiving member and said heating member, thereby forming a circulation pattern whereby the floor main body is effectively and uniformly heated substantially by solar energy.

2. A solar energy heating system located in a concrete or mortar type floor of a room or building and comprising:
   (A) a floor main body comprising
      (a) a floor structure comprising
         (i) a surface floor board, and
         (ii) a partitioned concrete or mortar layer underlying and supporting said surface floor board, said partitioned layer defining therein a plurality of open spaces; and
      (b) a container located within each of said plurality of open spaces, said containers capable of being filled with and storing water;
   (B) sunlight receiving member capable of holding water therein in fluid flow communication with at least some of said containers, wherein water contained within said sunlight receiving member may be heated by solar energy during times of exposure thereof to sunlight, and wherein said heated water is in fluid flow communication with water contained within said containers; and
   (C) a heating member at a lower elevation than the floor main body and joined in fluid flow communication to at least part of the sunlight receiving member, whereby water warmed by solar energy is conveyed in an upward direction by convection current to warm the water within the containers and wherein cooler water within said containers returns in a downward flow direction by convection current to the sunlight receiving member and said heating member, thereby forming a circulation pattern whereby the floor main body is effectively and uniformly heated substantially by solar energy.

3. The floor heating system according to claim 1 or claim 2, which further comprises a heat accumulator on the upper surface of the sunlight receiving member, whereby the efficiency of solar energy absorption is increased.

4. The floor heating system according to claim 1 or claim 2, which further comprises a substantially horizontal heat conductive controlling layer having a heat conductivity lower than the heat conductivity of water, said heat conductive controlling layer being located at an upper portion of said container, whereby when said container is filled with water, said controlling layer will control the heat conduction transfer from warmer water below the controlling layer to the cooler water above the controlling layer.

5. A solar energy heating system located in a ceiling of a room or building and comprising:
   (A) a ceiling main body comprising
      (a) a ceiling structure comprising
         (i) a surface ceiling board,
         (ii) an upper supporting layer, (iii) an intermediate layer formed by and between the surface ceiling board and the upper supporting layer; and, (iv) dividing frames dividing the intermediate layer into a plurality of open spaces; and (b) a container located within each of said plurality of open spaces, said containers capable of being filled with and storing water;

(B) sunlight receiving member capable of holding water therein in fluid flow communication with at least some of said containers, wherein water contained within said sunlight receiving member may be heated by solar energy during times of exposure thereof to sunlight, and wherein said heated water is in fluid flow communication with water contained within said containers; and (C) a heating member at a lower elevation than the ceiling main body and joined in fluid flow communication to at least part of the sunlight receiving member, whereby water warmed by solar energy is conveyed in an upward direction by convection current to warm the water within the containers and wherein cooler water within said containers returns in a downward flow direction by convection current to the sunlight receiving member and said heating member, thereby forming a circulation pattern whereby the ceiling main body is effectively and uniformly heated substantially by solar energy.

6. The ceiling heating system according to claim 5, which further comprises a heat accumulator on the upper surface of the sunlight receiving member, whereby the efficiency of solar energy absorption is increased.

7. The ceiling heating system according to claim 5, which further comprises a substantially horizontal heat conductive controlling layer having a heat conductivity lower than the heat conductivity of water, said heat conductive controlling layer being located at an upper portion of said container, whereby when said container is filled with water, said controlling layer will control the heat conduction transfer from warmer water below the controlling layer to cooler water above the controlling layer.

8. A solar energy cooling system located in a floor of a room or building and comprising:

(A) a floor main body comprising
(a) a floor structure comprising
(i) a surface floor board,
(ii) a bottom supporting layer,
(iii) an intermediate layer formed by and between the surface floor board and the bottom supporting layer; and,
(iv) dividing frames dividing the intermediate layer into a plurality of open spaces; and
(b) a container located within each of said plurality of open spaces, said containers capable of being filled with and storing water;

(B) ambient air contacting member capable of holding water therein in fluid flow communication with at least some of said containers, wherein water contained within said ambient air contacting member may be cooled by ambient air, and wherein said cooled water is in fluid flow communication with water contained within said containers; and (C) a cooling member at a higher elevation than the floor main body and joined in fluid flow communication to at least part of the ambient air contacting member, whereby water cooled by ambient air is conveyed in a downward direction by convection current to cool the water within the containers and wherein warmer water within said containers returns in an upward flow direction by convection current to the ambient air contacting member and said cooling member, thereby forming a circulation pattern whereby the floor main body is effectively and uniformly cooled substantially by ambient air.

9. A solar energy cooling system located in a ceiling of a room or building and comprising:

(A) a ceiling main body comprising
(a) a ceiling structure comprising
(i) a surface ceiling board,
(ii) an upper supporting layer,
(iii) an intermediate layer formed by and between the surface ceiling board and the upper supporting layer; and,
(iv) dividing frames dividing the intermediate layer into a plurality of open spaces; and
(b) a container located within each of said plurality of open spaces, said containers capable of being filled with and storing water;

(B) ambient air contacting member capable of holding water therein in fluid flow communication with at least some of said containers, wherein water contained within said ambient air contacting member may be cooled by ambient air, and wherein said cooled water is in fluid flow communication with water contained within said containers; and (C) a cooling member at a higher elevation than the ceiling main body and joined in fluid flow communication to at least part of the ambient air contacting member, whereby water cooled by ambient air is conveyed in a downward direction by convection current to cool the water within the containers and wherein warmer water within said containers returns in an upward flow direction by convection current to the ambient air contacting member and said cooling member, thereby forming a circulation pattern whereby the ceiling main body is effectively and uniformly cooled substantially by ambient air.

* * * * *